US008817735B1

(12) United States Patent
Oroskar et al.

(10) Patent No.: US 8,817,735 B1
(45) Date of Patent: Aug. 26, 2014

(54) SYSTEMS AND METHODS FOR ALLOCATING FULLY-ORTHOGONAL AND QUASI-ORTHOGONAL SPREADING CODES TO ACCESS TERMINALS IN RADIO ACCESS NETWORKS BASED ON A TOLERANCE LEVEL FOR ADDITIONAL INTERFERENCE ON A PER-ACCESS-TERMINAL BASIS

(71) Applicant: Sprint Spectrum L.P., Overland Park, KS (US)

(72) Inventors: Siddharth S. Oroskar, Overland Park, KS (US); Sachin R. Vargantwar, Macon, GA (US)

(73) Assignee: Sprint Spectrum L.P., Overland Park, KS (US)

( * ) Notice: Subject to any disclaimer, the term of this patent is extended or adjusted under 35 U.S.C. 154(b) by 147 days.

(21) Appl. No.: 13/631,140

(22) Filed: Sep. 28, 2012

(51) Int. Cl.
| | |
|---|---|
| *H04W 4/00* | (2009.01) |
| *H04J 13/16* | (2011.01) |
| *H04J 13/18* | (2011.01) |
| *H04J 13/00* | (2011.01) |
| *H04W 72/04* | (2009.01) |
| *H04B 7/04* | (2006.01) |
| *H04B 7/216* | (2006.01) |
| *H04B 1/69* | (2011.01) |
| *H04L 1/06* | (2006.01) |

(52) U.S. Cl.
CPC .............. *H04J 13/16* (2013.01); *H04J 13/18* (2013.01); *H04J 13/00* (2013.01); *H04W 72/04* (2013.01); *H04B 7/04* (2013.01); *H04B 7/216* (2013.01); *H04B 1/69* (2013.01); *H04L 1/0668* (2013.01)
USPC .......................................... 370/329; 455/450

(58) Field of Classification Search
None
See application file for complete search history.

(56) References Cited

U.S. PATENT DOCUMENTS

| | | | | |
|---|---|---|---|---|
| 5,832,029 | A * | 11/1998 | Mimura ......................... | 375/149 |
| 6,912,241 | B2 * | 6/2005 | Giannakis et al. ............. | 375/141 |
| 7,376,076 | B2 * | 5/2008 | You et al. ...................... | 370/209 |
| 7,664,090 | B2 * | 2/2010 | Anderson et al. .............. | 370/342 |
| 7,680,211 | B1 * | 3/2010 | von der Embse ............. | 375/299 |
| 8,144,570 | B2 * | 3/2012 | Tiirola et al. .................. | 370/203 |
| 8,169,950 | B2 * | 5/2012 | Shen et al. ..................... | 370/328 |
| 8,289,908 | B2 * | 10/2012 | Barriac ......................... | 370/329 |
| 8,331,285 | B2 * | 12/2012 | Prakash ........................ | 370/328 |
| 8,441,918 | B2 * | 5/2013 | Ma et al. ....................... | 370/208 |
| 8,542,572 | B2 * | 9/2013 | Zhang et al. .................. | 370/208 |
| 8,670,497 | B2 * | 3/2014 | Grant et al. ................... | 375/267 |
| 2001/0021229 | A1 * | 9/2001 | Belaiche ....................... | 375/295 |
| 2003/0126551 | A1 * | 7/2003 | Mantha et al. ................ | 714/790 |
| 2003/0215004 | A1 * | 11/2003 | Vihriala ........................ | 375/148 |
| 2005/0123023 | A1 * | 6/2005 | Smith et al. ................... | 375/130 |
| 2008/0159324 | A1 * | 7/2008 | Bosch et al. .................. | 370/432 |

(Continued)

*Primary Examiner* — Bunjob Jaroenchonwanit (57) ABSTRACT

Disclosed herein are systems and methods for allocating fully-orthogonal and quasi-orthogonal spreading codes to access terminals in radio access networks based on a tolerance level for additional interference on a per-access-terminal basis. An embodiment takes the form of a method that includes receiving a request for allocation of a spreading code to an access terminal, and responsively comparing an additional-capacity number to an available-codes number. The additional-capacity number represents, based on an average contribution per access terminal to the current reverse noise, how many additional fully-orthogonal spreading codes could be allocated to access terminals without exceeding a maximum-allowed reverse noise. The available-codes number represents how many fully-orthogonal spreading codes are currently available for allocation. The method further involves allocating a fully-orthogonal spreading code to the access terminal when the additional-capacity number is greater than or equal to the available-codes number, and otherwise allocating a quasi-orthogonal spreading code.

20 Claims, 5 Drawing Sheets

(56) References Cited

U.S. PATENT DOCUMENTS

2008/0285534 A1* 11/2008 Dent .......................... 370/342
2009/0274105 A1* 11/2009 Choi et al. ................... 370/329
2011/0141901 A1* 6/2011 Luo et al. .................... 370/241
2012/0039270 A1* 2/2012 Nguyen et al. .............. 370/329
2012/0320855 A1* 12/2012 Tesanovic et al. ........... 370/329
2013/0287064 A1* 10/2013 Seo et al. .................... 375/144

* cited by examiner

SYSTEMS AND METHODS FOR ALLOCATING FULLY-ORTHOGONAL AND QUASI-ORTHOGONAL SPREADING CODES TO ACCESS TERMINALS IN RADIO ACCESS NETWORKS BASED ON A TOLERANCE LEVEL FOR ADDITIONAL INTERFERENCE ON A PER-ACCESS-TERMINAL BASIS

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to herein as access terminals, though this term is intended to broadly encompass devices known as mobile stations, user equipment, mobile devices, wireless-communication devices, cell phones, smartphones, personal digital assistants, tablets, laptops, air cards, Universal Serial Bus (USB) dongles, and/or any other device or combination of devices capable of functioning as an access terminal according to this disclosure.

Typically, the wireless communications that are sent from the RAN to one or more access terminals are described as being sent on the "forward link," while those wireless communications that are sent from one or more access terminals to the RAN are described as being sent on the "reverse link." These communications are typically formatted in accordance with a wireless-communication protocol, one example type of which is known as Code Division Multiple Access (CDMA). Moreover, CDMA networks that operate according to industry specifications such as IS-95 and IS-2000 are often referred to as 1xRTT (or just "1x") networks, where 1xRTT stands for "Single Carrier Radio Transmission Technology."

Furthermore, some RANs operate according to a particular type of CDMA protocol known as EV-DO ("Evolution Data Optimized"). These RANs are generally configured to operate according to one or more versions of industry specification IS-856, and are designed to provide high-rate packet-data service, including Voice over Internet Protocol (IP) (VoIP) service, to access terminals using a technique that is known as time-division multiplexing (TDM) on the forward link and what is essentially 1x-CDMA technology on the reverse link.

More generally, RANs can be configured to operate according to any of numerous other wireless-communication protocols, some examples of which are WiMAX (IEEE 802.16), Long Term Evolution (LTE), time division multiple access (TDMA), Global System for Mobile Communications (GSM), Wi-Fi (IEEE 802.11), and the like. Furthermore, some ("hybrid") access terminals are equipped and arranged to be able to communicate according to multiple wireless-communication protocols (e.g., 1xCDMA and EV-DO).

In RANs that are of a type often known as wireless wide area networks (WWANs) (or cellular wireless networks), the entities with which access terminals communicate over the air interface are known by terms such as "base stations" and "access nodes," among others. These terms are sometimes used in different ways to refer to different entities. For example, the term "base station" is sometimes used to describe simply a device known as a base transceiver station (BTS), which contains the hardware, antennas, and so forth that actually conduct the over-the-air portion of the communication with the access terminals on behalf of the RAN. At times, however, the term "base station" or "access node" is used to refer to a combination of (i) one or more BTSs and (ii) a device known as a "base station controller" (BSC) (or "radio network controller" (RNC)), which controls the BTS(s) and connects it (them) to the rest of the network.

In a typical scenario, an access terminal registers with a RAN via a particular BTS, and then operates in what is known as "idle mode" on a carrier frequency in a coverage area (e.g., a sector) provided by that BTS. If the access terminal is attempted to be contacted by another telephone, computer, or other communication device, the RAN will typically send the access terminal a page message via at least that particular BTS. The access terminal would typically respond by requesting and establishing communication on what is known as an air-interface traffic channel (or simply a "traffic channel") and then conduct the relevant communication. In other instances, the access terminal is the initiator (perhaps when its user requests a webpage), in which case the access terminal sends the RAN an access-request message in order to request and establish communication on a traffic channel and then conduct the relevant communication.

Traffic channels take different forms under different types of air-interface protocols. In TDMA networks, traffic channels typically take the form of one or more timeslots of a repeating waveform on a carrier frequency used by multiple access terminals. In other words, in TDMA networks, different access terminals on different traffic channels take turns using the full transmit power of the base station at different times. In CDMA networks by contrast, different access terminals on different traffic channels simultaneously share the transmit power of the base station. In such networks, different traffic channels are delineated by the RAN applying different codes to different channels. These codes are generally known as spreading codes, and one commonly used type of spreading codes are known as Walsh codes.

Furthermore, there are multiple different types of spreading codes, perhaps best described by the relationship of the codes to one or more other codes. Some spreading codes are of a type known as fully-orthogonal spreading codes. As known in the art, when multiple spreading codes are simultaneously used in a sector on a carrier to delineate multiple traffic channels, none of the communications on any of those traffic channels will interfere with the communications on any other of those traffic channels if the spreading codes that are used are fully-orthogonal with respect to one another. If, however, the spreading codes are only quasi-orthogonal with respect to one another, then interference to some degree can and often will occur. Thus, fully-orthogonal spreading codes are typically preferred to quasi-orthogonal spreading codes, though, all else being equal, a lower maximum capacity can be realized using the former as opposed to the latter.

Overview

Presently disclosed are systems and methods for allocating fully-orthogonal and quasi-orthogonal spreading codes to access terminals in radio access networks based on a tolerance level for additional interference on a per-access-terminal basis. One embodiment takes the form of a method carried out by at least one RAN entity that includes at least one communication interface, at least one processor, and data storage having stored thereon program instructions executable by the at least one processor for carrying out the method, which includes receiving a request for allocation to a given access terminal of a spreading code corresponding to a traffic channel in a coverage area.

The method further includes, responsive to receiving the request, comparing an additional-capacity number for the coverage area to an available-codes number for the coverage area. The additional-capacity number represents, based on an average contribution per access terminal to a current reverse noise in the coverage area, how many additional fully-orthogonal spreading codes corresponding to traffic channels in the coverage area could be allocated to access terminals without exceeding a maximum-allowed reverse noise in the coverage area. The available-codes number represents how many fully-orthogonal spreading codes corresponding to traffic channels in the coverage area are currently available for allocation to access terminals.

The method further includes (i) allocating a fully-orthogonal spreading code to the given access terminal when the additional-capacity number is greater than or equal to the available-codes number and (ii) allocating a quasi-orthogonal spreading code to the given access terminal when the additional-capacity number is less than the available-codes number.

Another embodiment takes the form of at least one RAN entity that includes at least one wireless-communication interface, at least one processor, and data storage containing program instructions executable by the at least one processor for carrying out the just-described method.

Thus, according to the present systems and methods, it may from time to time be determined that, based on the current per-access-terminal contribution to reverse noise (e.g., in a given sector on a given carrier) that it will not likely be possible to, if requested, allocate all of the remaining fully-orthogonal spreading codes to requesting access terminals without exceeding a maximum-allowable (which could also be phrased as maximum-acceptable) total amount of reverse noise (again, perhaps, in the given sector on the given carrier).

As presently disclosed, when this situation is identified, the RAN shifts from allocating fully-orthogonal spreading codes to allocating quasi-orthogonal spreading codes in response to traffic-channel requests from access terminals. While in general the use of quasi-orthogonal spreading codes is less preferred than the use of fully-orthogonal spreading codes due to the former involving interference with one another and the latter not involving such interference, in some cases such as the situation described herein, it is preferable to use quasi-orthogonal codes, which produce less overall noise than their fully-orthogonal counterparts, rather than having some users be fully blocked from network access, among other reasons.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

II. Example Architecture

A. Example Communication System

Figure 1:
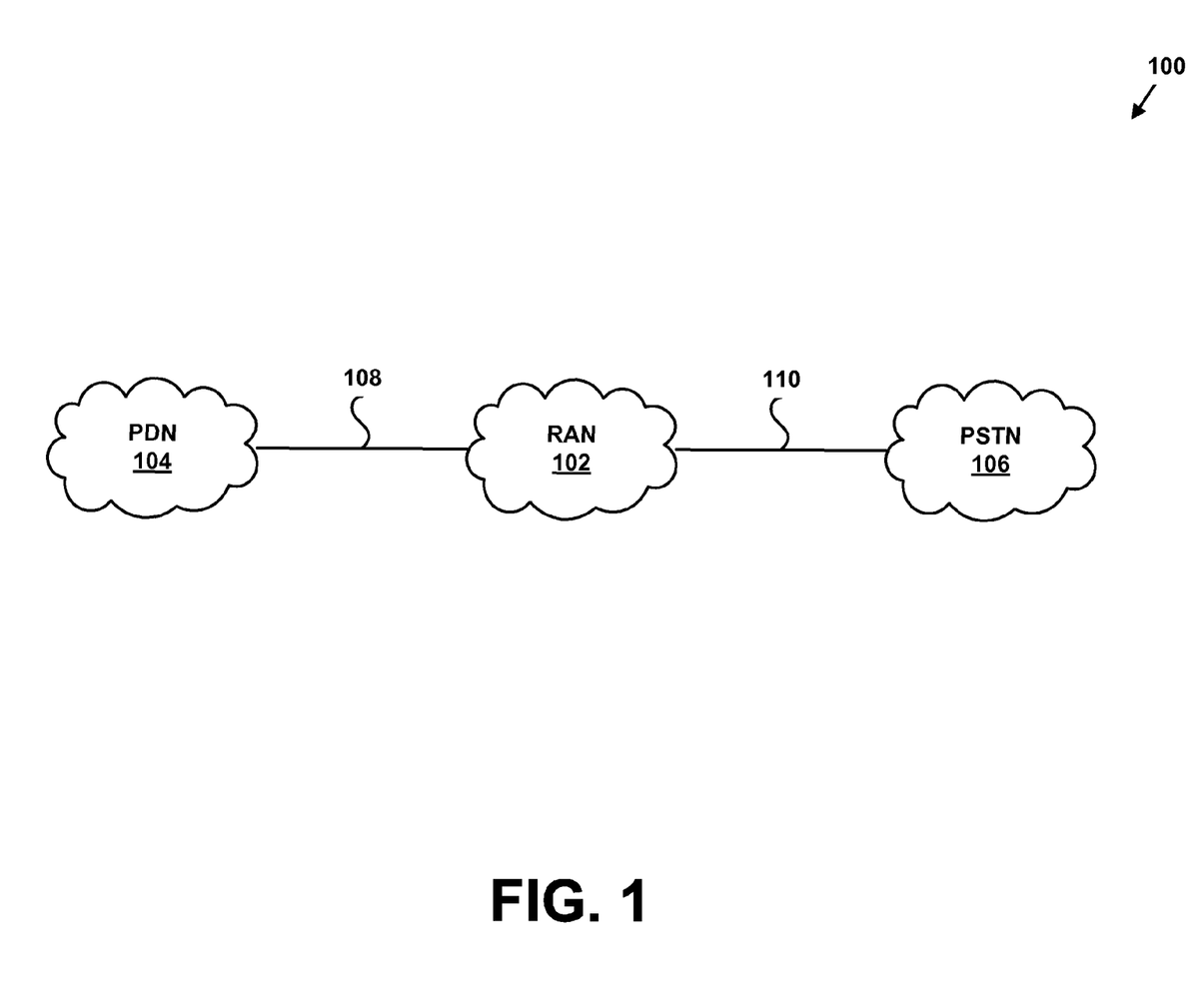
FIG. 1 depicts an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

B. Example Radio Access Network (RAN)

Figure 2:
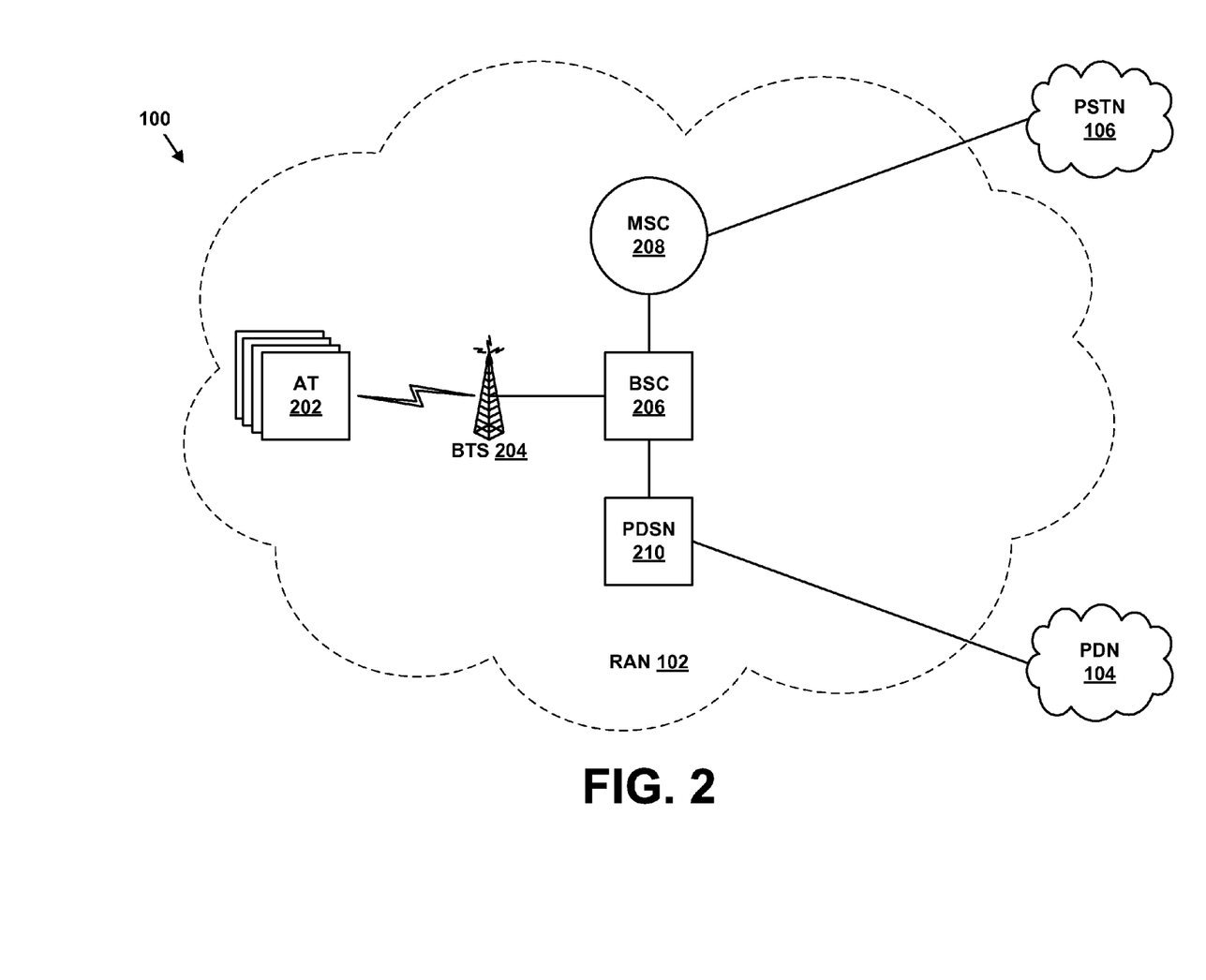
FIG. 2 depicts an example radio access network (RAN) in the context of the example communication system of FIG. 1.

FIG. 2 depicts communication system 100 with a more detailed depiction of RAN 102, which is shown in this example as including a plurality of access terminals 202, a BTS 204, a BSC 206, a mobile switching center (MSC) 208, and a packet data serving node (PDSN) 210. Additional entities could also be present, such as additional access terminals in communication with BTS 204, additional entities in communication with PDN 104 and/or PSTN 106, etc. Also, there could be one or more routers, switches, and/or other devices or networks making up at least part of one or more of the communication links. And other variations are possible as well.

An example access terminal is described below in connection with FIG. 3, while an example RAN entity is described below in connection with FIG. 4. The example access terminal could represent any one or more of the access terminals 202, while the example RAN entity could represent any one or any combination of BTS 204, BSC 206, MSC 208, PDSN 210, one or more network servers, and/or one or more other devices and/or entities of any other type that are suitably arranged, programmed, and configured to, alone and/or in various combinations, carry out the functions described herein as being carried out by at least one RAN entity.

BTS 204 generally functions to provide one or more coverage areas on one or more carrier frequencies, and to interface between air-interface communications with access terminals on the one hand and "backhaul" communications with BSC 206 on the other hand. BSC 206 generally functions to control one or more BTSs, and to provide one or more BTSs with connections to devices such as MSC 208 and PDSN 210. MSC 208 generally functions to connect BSCs to circuit-switched networks such as PSTN 106, and serves at least a telephone-switch function to facilitate such connections. PDSN 210 generally functions to connect BSCs to packet-switched networks such as PDN 104, which could be the Internet, and serves a at least a network-access-server (NAS) function to facilitate such connections.

C. Example Access Terminal

Figure 3:
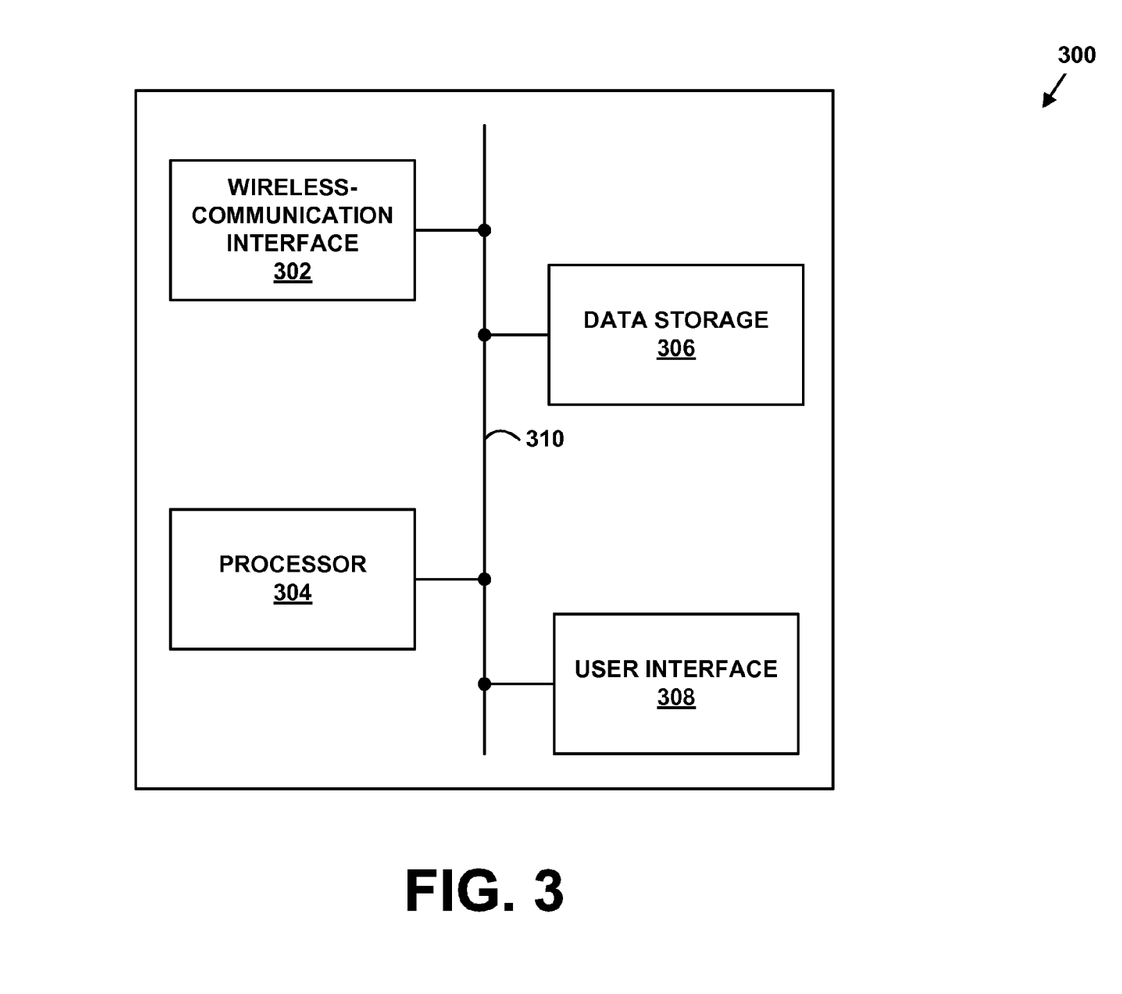
FIG. 3 depicts an example access terminal.

FIG. 3 depicts an example access terminal 300 as including a wireless-communication interface 302, a processor 304, data storage 306, and a user interface 308, all of which may be coupled together by a system bus, network, or other communication mechanism 310.

Wireless-communication interface 302 may comprise one or more antennae and one or more chipsets for communicating with one or more base stations over respective air interfaces. As an example, one such chipset could be one that is suitable for CDMA (Code Division Multiple Access) communication. The chipset or wireless-communication interface in general may also or instead be arranged to communicate according to one or more other types (e.g. protocols) mentioned herein and/or any others now known or later developed.

Processor 304 may comprise one or more general-purpose processors and/or one or more special-purpose processors, and may be integrated in whole or in part with wireless-communication interface 302. Data storage 306 may comprise one or more volatile and/or non-volatile storage components (such as magnetic, optical, flash, or other non-transitory storage) and may be integrated in whole or in part with processor 304. And certainly other configurations are possible. Data storage 306 may contain program instructions executable by processor 304 for carrying out various access-terminal functions described herein. User interface 308 may include one or more input devices such as a touchscreen, one or more buttons, a microphone, and the like for receiving inputs from users, as well as one or more output devices such a display, one or more indicator lights, a speaker, and the like for communicating outputs to users.

D. Example Radio Access Network (RAN) Entity

Figure 4:
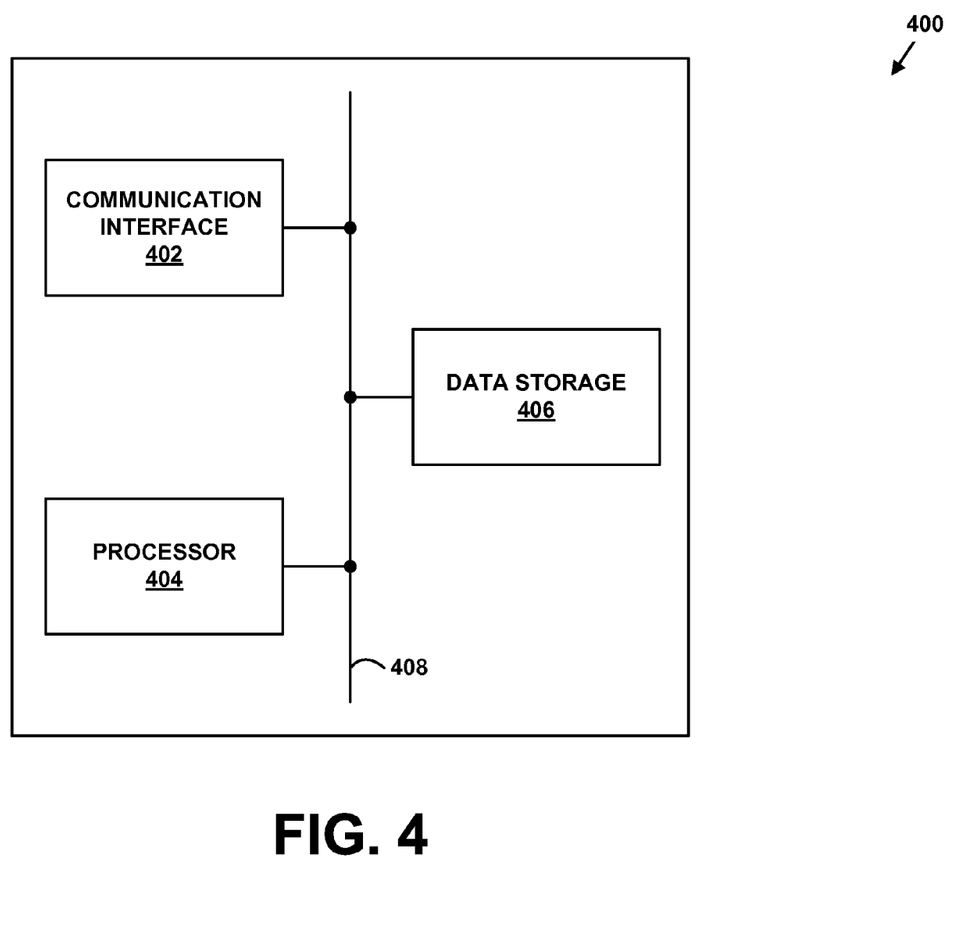
FIG. 4 depicts an example RAN entity.

FIG. 4 depicts an example RAN entity 400 as including a communication interface 402, a processor 404, and data storage 406, all of which may be coupled together by a system bus, network, or other communication mechanism 408. Communication interface 402 may include one or more interfaces (e.g., an Ethernet card) for engaging in wired communication and/or one or more interfaces (e.g., a Wi-Fi interface) for engaging in wireless communication. Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage) and may be integrated in whole or in part with processor 404. And certainly other configurations are possible. Data storage 406 may contain program instructions executable by processor 404 for carrying out various RAN-entity functions described herein. RAN entity 400 may also have a user interface and/or one or more other components deemed suitable for a particular context.

III. Example Operation

Figure 5:
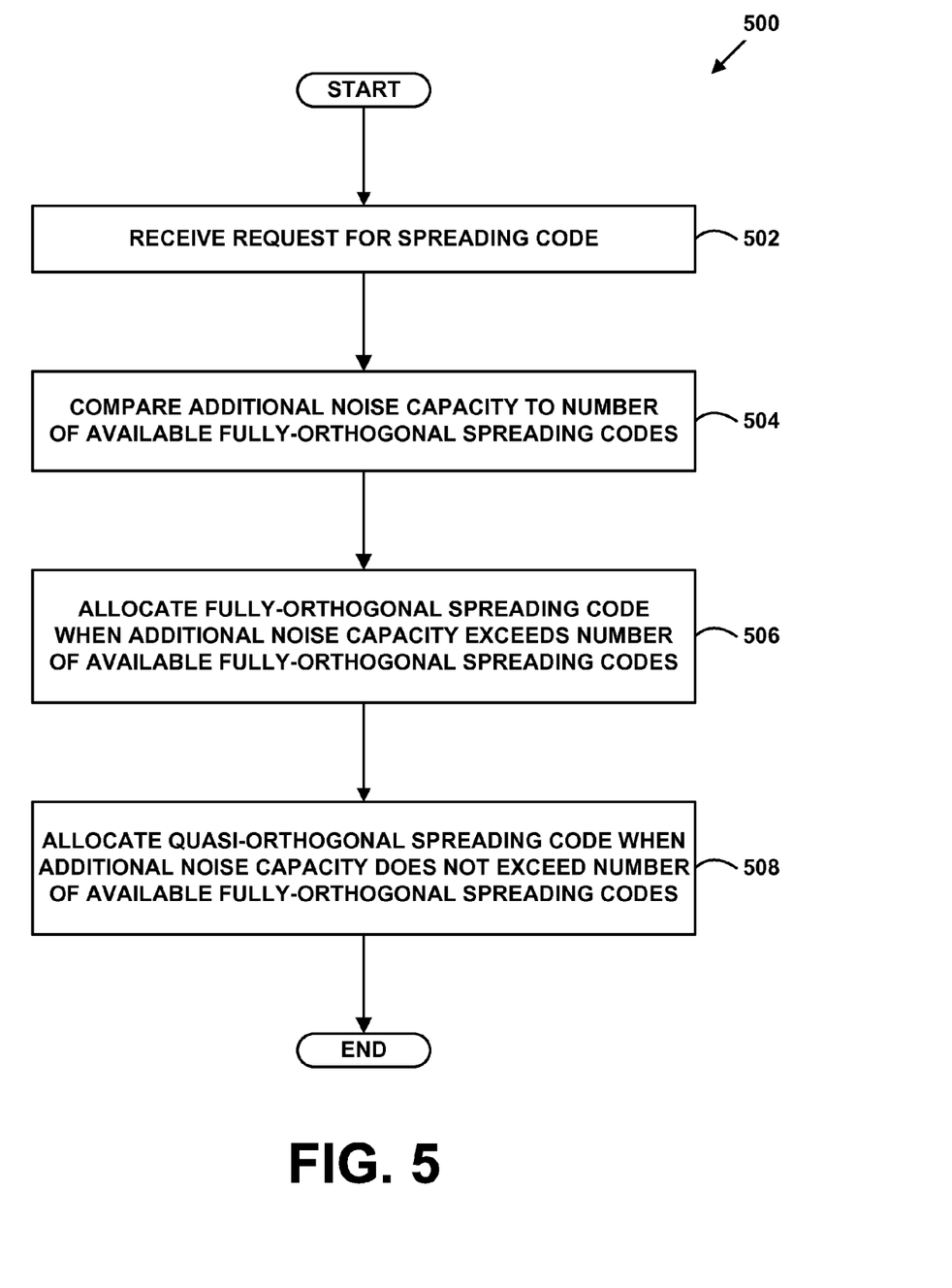
FIG. 5 depicts functions carried out in accordance with at least one embodiment.

FIG. 5 is a flowchart that depicts functions carried out in accordance with at least one embodiment. More particularly, FIG. 5 depicts a method 500 carried out by at least one RAN entity. Method 500 begins at 502 with receiving a request for allocation to a given access terminal of a spreading code corresponding to a traffic channel in a coverage area. This request may, and would typically be, received from the given access terminal itself, though this is not necessary. The requested spreading code, as well as any other spreading codes mentioned herein, could be or at least include Walsh codes, though this is purely by way of example.

Method 500 continues at 504 with, responsive to receiving the request at 502, comparing an additional-capacity number for the coverage area to an available-codes number for the coverage area. The additional-capacity number represents, based on an average contribution per access terminal to a current reverse noise in the coverage area, how many additional fully-orthogonal spreading codes corresponding to traffic channels in the coverage area could be allocated to access terminals without exceeding a maximum-allowed reverse noise in the coverage area. The available-codes number represents how many fully-orthogonal spreading codes corresponding to traffic channels in the coverage area are currently available for allocation to access terminals. Thus, it may be the case that some number of traffic channels had already been assigned to various other access terminals, and further that a fully-orthogonal spreading code had been allocated to a respective access terminal in connection with each such assignment. And some number (the available-codes number) of fully-orthogonal spreading codes from the full set that theoretically could be assigned to access terminals may remain unallocated.

The carrying out of method 500 may involve computing the additional-capacity number, perhaps after receiving the request at 502. In some embodiments, the additional-capacity number is computed periodically. And certainly other approaches could be used.

In at least one embodiment, computing the additional-capacity number involves carrying out the following steps. The first step is determining (e.g., measuring or otherwise accessing) a current-noise number, which represents the current reverse noise in the coverage area. The second step is determining an allocated-codes number, which represents how many fully-orthogonal spreading codes corresponding to traffic channels in the coverage area are currently allocated to access terminals. The third step is computing the average contribution per access terminal to the current reverse noise in the coverage area by dividing the current-noise number by the allocated-codes number. The fourth step is computing a noise-tolerance number by subtracting the current-noise number from the maximum-allowed reverse noise in the coverage area. The fifth and final step is computing the additional-capacity number by dividing the noise-tolerance number by the average contribution per access terminal to the current reverse noise in the coverage area. This is of course an example approach, and others could be used.

In an embodiment, the available-codes number is computed, perhaps by subtracting the number of fully-orthogonal spreading codes corresponding to traffic channels in the coverage area that are currently allocated to access terminals from a maximum number of fully-orthogonal spreading codes corresponding to traffic channels in the coverage area that theoretically could be allocated to access terminals. And certainly other approaches could be used as well.

Method 500 continues at 506 with allocating a fully-orthogonal spreading code to the given access terminal (associated with the request at 502) when the additional-capacity number is greater than or equal to the available-codes number, and at 508 with allocating a quasi-orthogonal spreading code to the given access terminal when instead the additional-capacity number is less than the available-codes number.

IV. Conclusion

While some example embodiments have been described above, those of ordinary skill in the art will appreciate that numerous changes to the described embodiments could be made without departing from the scope and spirit of the claims.

We claim:

1. A method carried out by at least one radio access network (RAN) entity, the at least one RAN entity comprising at least one communication interface, at least one processor, and data storage having stored thereon program instructions executable by the at least one processor for carrying out the method, which comprises:
   receiving a request for allocation to a given access terminal of a spreading code corresponding to a traffic channel in a coverage area;
   responsive to receiving the request, comparing an additional-capacity number for the coverage area to an available-codes number for the coverage area, wherein:
      the additional-capacity number represents, based on an average contribution per access terminal to a current reverse noise in the coverage area, how many additional fully-orthogonal spreading codes corresponding to traffic channels in the coverage area could be allocated to access terminals without exceeding a maximum-allowed reverse noise in the coverage area, and
      the available-codes number represents how many fully-orthogonal spreading codes corresponding to traffic channels in the coverage area are currently available for allocation to access terminals;
   allocating a fully-orthogonal spreading code to the given access terminal when the additional-capacity number is greater than or equal to the available-codes number; and
   allocating a quasi-orthogonal spreading code to the given access terminal when the additional-capacity number is less than the available-codes number.

2. The method of claim 1, wherein the at least one RAN entity comprises one or more entities selected from a set of entities, the set of entities consisting of a base transceiver station (BTS), a base station controller (BSC), and a mobile switching center (MSC).

3. The method of claim 1, wherein receiving the request comprises receiving the request from the given access terminal.

4. The method of claim 1, wherein the spreading codes comprise Walsh codes.

5. The method of claim 1, wherein the spreading codes are Walsh codes.

6. The method of claim 1, further comprising computing the additional-capacity number.

7. The method of claim 6, wherein computing the additional-capacity number comprises computing the additional-capacity number after receiving the request.

8. The method of claim 6, wherein computing the additional-capacity number comprises periodically computing the additional-capacity number.

9. The method of claim 6, wherein computing the additional-capacity number comprises:
   determining a current-noise number, wherein the current-noise number represents the current reverse noise in the coverage area;
   determining an allocated-codes number, wherein the allocated-codes number represents how many fully-orthogonal spreading codes corresponding to traffic channels in the coverage area are currently allocated to access terminals;
   computing the average contribution per access terminal to the current reverse noise in the coverage area by dividing the current-noise number by the allocated-codes number;
   computing a noise-tolerance number by subtracting the current-noise number from the maximum-allowed reverse noise in the coverage area; and
   computing the additional-capacity number by dividing the noise-tolerance number by the average contribution per access terminal to the current reverse noise in the coverage area.

10. The method of claim 1, further comprising computing the available-codes number by subtracting a number of fully-orthogonal spreading codes corresponding to traffic channels in the coverage area that are currently allocated to access terminals from a maximum number of fully-orthogonal spreading codes corresponding to traffic channels in the coverage area that theoretically could be allocated to access terminals.

11. A system comprising at least one radio access network (RAN) entity, wherein the at least one RAN entity comprises:
   at least one wireless-communication interface;
   at least one processor; and
   data storage containing program instructions executable by the at least one processor for carrying out a set of functions, wherein the set of functions includes:
      receiving a request for allocation to a given access terminal of a spreading code corresponding to a traffic channel in a coverage area;
      responsive to receiving the request, comparing an additional-capacity number for the coverage area to an available-codes number for the coverage area, wherein:
         the additional-capacity number represents, based on an average contribution per access terminal to a current reverse noise in the coverage area, how many additional fully-orthogonal spreading codes corresponding to traffic channels in the coverage area could be allocated to access terminals without exceeding a maximum-allowed reverse noise in the coverage area, and
         the available-codes number represents how many fully-orthogonal spreading codes corresponding to traffic channels in the coverage area are currently available for allocation to access terminals;
      allocating a fully-orthogonal spreading code to the given access terminal when the additional-capacity number is greater than or equal to the available-codes number; and
      allocating a quasi-orthogonal spreading code to the given access terminal when the additional-capacity number is less than the available-codes number.

12. The system of claim 11, wherein the at least one RAN entity comprises one or more entities selected from a set of entities, the set of entities consisting of a base transceiver station (BTS), a base station controller (BSC), and a mobile switching center (MSC).

13. The system of claim 11, wherein receiving the request comprises receiving the request from the given access terminal.

14. The system of claim 11, wherein the spreading codes comprise Walsh codes.

15. The system of claim 11, wherein the spreading codes are Walsh codes.

16. The system of claim 11, wherein the set of functions further includes computing the additional-capacity number.

17. The system of claim 16, wherein computing the additional-capacity number comprises computing the additional-capacity number after receiving the request.

18. The system of claim 16, wherein computing the additional-capacity number comprises periodically computing the additional-capacity number.

19. The system of claim 16, wherein computing the additional-capacity number comprises:

determining a current-noise number, wherein the current-noise number represents the current reverse noise in the coverage area;

determining an allocated-codes number, wherein the allocated-codes number represents how many fully-orthogonal spreading codes corresponding to traffic channels in the coverage area are currently allocated to access terminals;

computing the average contribution per access terminal to the current reverse noise in the coverage area by dividing the current-noise number by the allocated-codes number;

computing a noise-tolerance number by subtracting the current-noise number from the maximum-allowed reverse noise in the coverage area; and computing the additional-capacity number by dividing the noise-tolerance number by the average contribution per access terminal to the current reverse noise in the coverage area.

20. The system of claim 11, wherein the set of functions further includes computing the available-codes number by subtracting a number of fully-orthogonal spreading codes corresponding to traffic channels in the coverage area that are currently allocated to access terminals from a maximum number of fully-orthogonal spreading codes corresponding to traffic channels in the coverage area that theoretically could be allocated to access terminals.

* * * * *